UNITED STATES PATENT OFFICE.

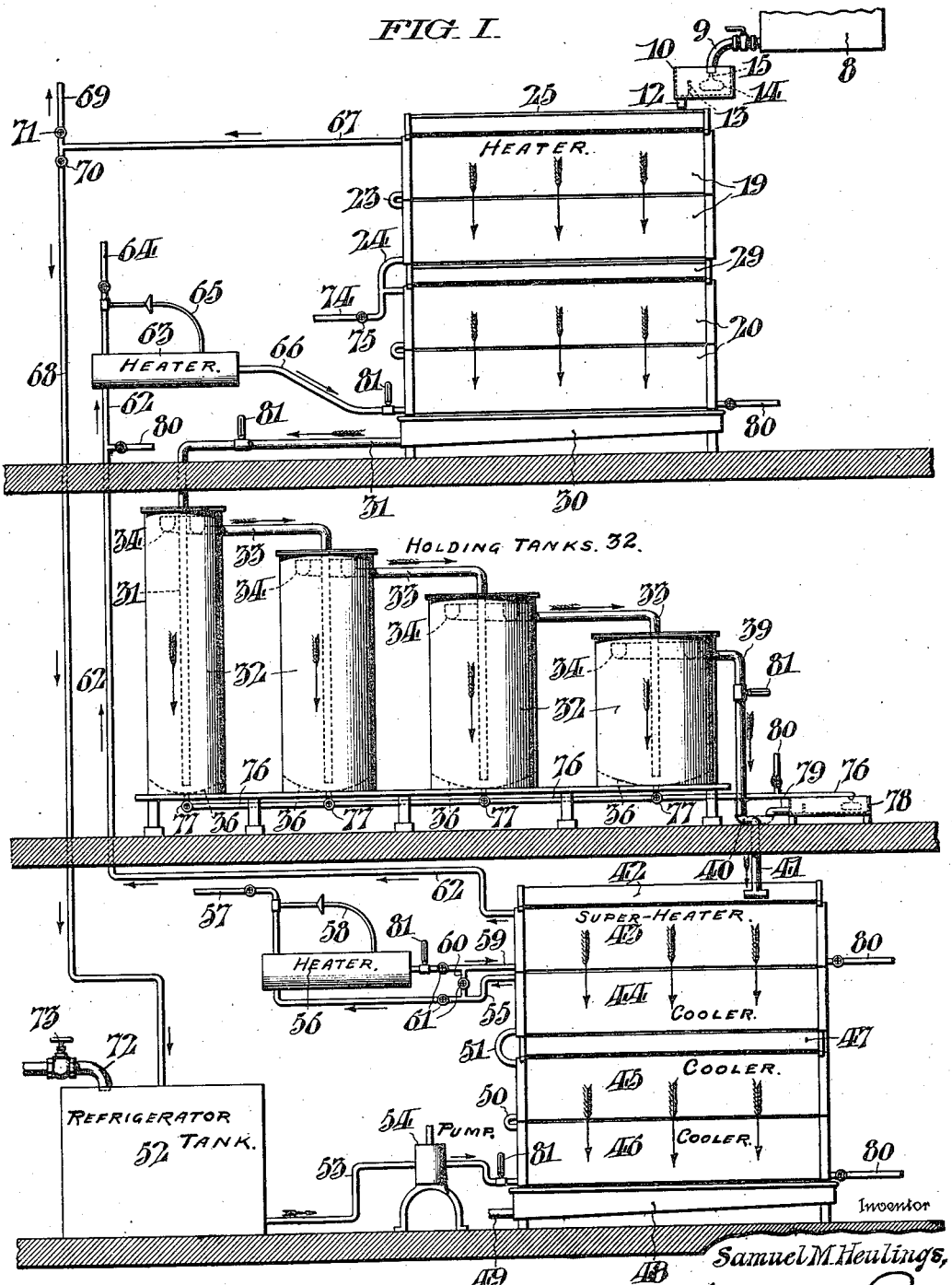

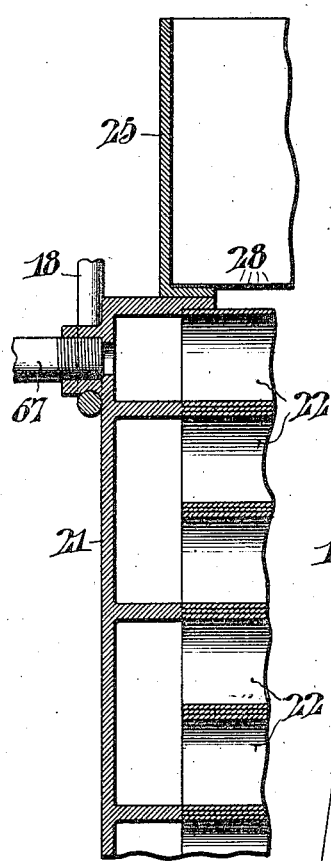
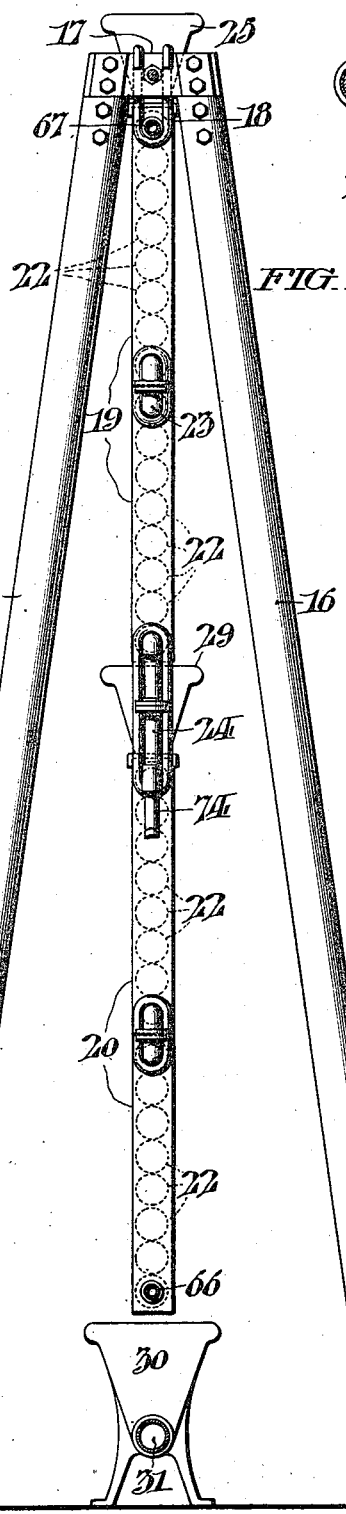
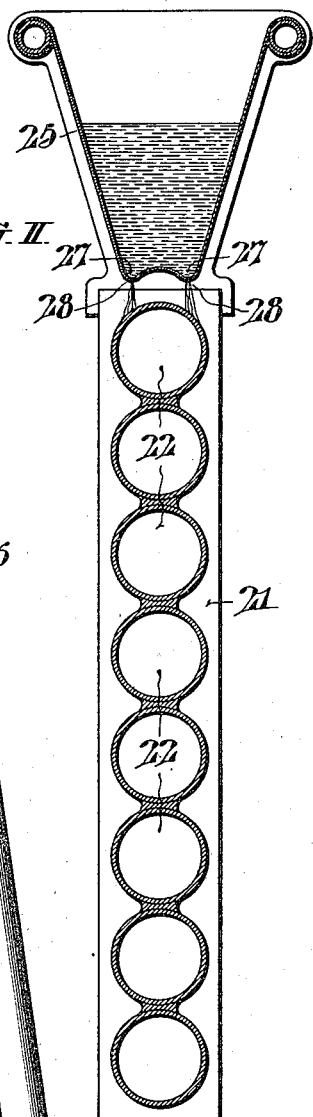
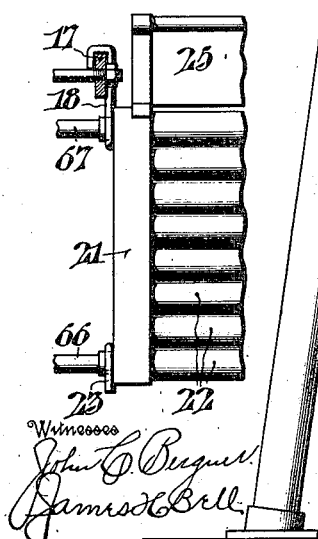

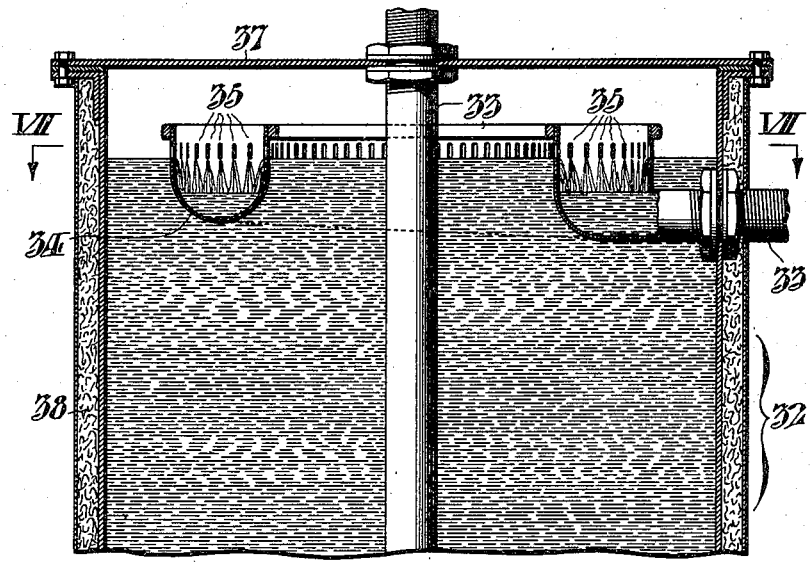
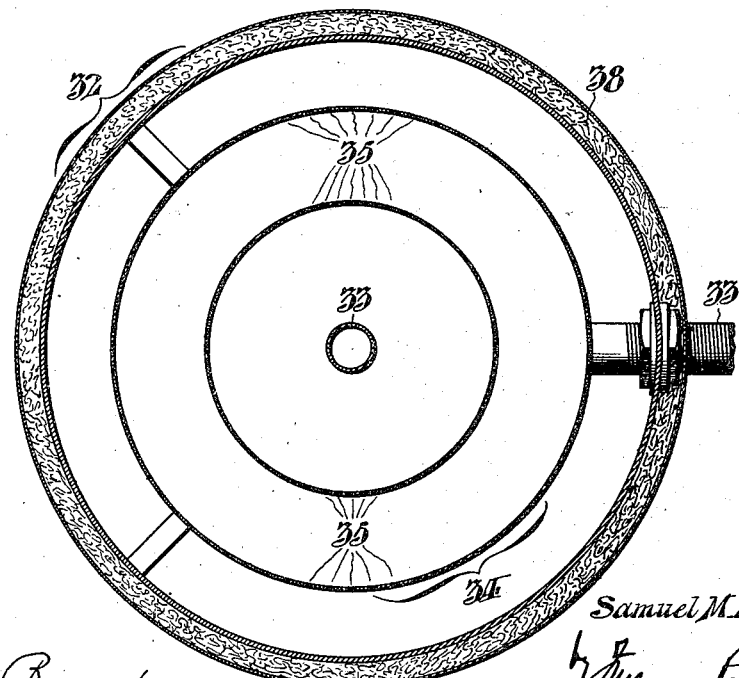

SAMUEL M. HEULINGS, OF HADDONFIELD, NEW JERSEY.

APPARATUS FOR PASTEURIZING FLUIDS.

1,310,017.  Specification of Letters Patent.  Patented July 15, 1919.

Application filed March 28, 1914. Serial No. 827,813.

*To all whom it may concern:*

Be it known that I, SAMUEL M. HEULINGS, of Haddonfield, in the county of Camden and State of New Jersey, have invented a certain new and useful Apparatus for Pasteurizing Fluids, whereof the following is a specification, reference being had to the accompanying drawings.

The present invention relates more particularly to an apparatus for the pasteurizing of milk or other fluids, wherein the fluid is heated to a pasteurizing temperature and is held at such temperature to effect the proper or perfect pasteurization of the same and is then subsequently heated to a higher temperature and then cooled. Such a process of pasteurization is shown, described and claimed in my co-pending application, Serial No. 809,444, filed December 30, 1913. It will be obvious however that the apparatus may be used for other purposes, if desired.

An object of the invention is to provide an apparatus in which the above process may be carried out with the utmost accuracy, all portions of the fluid to be pasteurized to be subjected to complete treatment and all actions which might deleteriously affect the product, being materially eliminated.

A further object of the invention is to provide an apparatus of the above character employing a regenerative feature that materially reduces the cost of operation.

These and other objects will in part be obvious and will in part be hereinafter more fully disclosed.

In the drawings, which show by way of illustration one embodiment of the invention, Figure I, is a view in elevation and somewhat diagrammatic in its character, illustrating the apparatus.

Fig. II, is an end elevation on an enlarged scale of the preliminary heater.

Fig. III, is a detail sectional view through one end portion thereof.

Fig. IV, is a side elevation of said end portion.

Fig. V, is a cross sectional end view.

Fig. VI, is a vertical sectional view through the upper portion of one of the containers, illustrating the equalizer therein in vertical section.

Fig. VII, is a horizontal sectional view on VII—VII of Fig. VI.

In the embodiment illustrated, the milk or other fluid to be treated, is placed in a tank 8, and is delivered therefrom through a faucet 9, into a flow controller, comprising a tank 10, provided in its bottom with an outlet spout 12, of such area of opening as may be required to feed the desired amount of milk in a desired period of time, and having a transverse partition or dam 13, across its interior, between the delivery faucet 9, and the said spout 12. A flow controller 14, in the form of a float, is located in the tank 10, and has an upstanding portion 15, movable into and out of the discharge end of the faucet 9, or other suitable means, to control the flow of liquid therefrom and prevent overflowing by careless operation. It will thus be evident that the milk is maintained at substantially an even height or level within the tank 10, and the dam serves to prevent the whirl of the milk as it is discharged from the faucet 9, from influencing the flow through the discharge spout 12.

Located below the flow controller is a heater, which is illustrated in detail in Figs. II–IV inclusive. Sets of supporting standards 16, are connected at their upper ends by cross bars 17. Hung from these cross bars, by means of U-shaped stirrup-hooks 18, is a sectional heater, the sections thereof being arranged in pairs which are designated respectively 19, and 20. Each section consists of end headers 21, connected by tube elements 22, said tube elements being so arranged with respect to the headers that a back and forth circulation of a heating medium can be produced in the heater section, as will be evident by reference to Fig. III. The sections of the upper pair are connected by a suitable coupling 23. The upper section of the lower pair and the lower section of the upper pair are in like manner connected by a suitable coupling 24. Mounted above the upper pair of sections is a trough 25, that receives the milk from the discharge spout 12, and said trough has an upwardly concaved bottom 26, forming spaced longitudinal depressions 27, that are provided with orifices 28, which distribute the milk on each side of the upper tube of the uppermost section, as will be evident by reference to Figs. III and V. Located between the upper and lower pair of sections is an intermediate trough 29, which receives the milk after it passes over the upper pair, and re-distributes it on the upper section of the lower pair. After passing over the lower pair of sections, the milk is collected in a trough 30, arranged beneath this preliminary heater. From the trough 30, the collected milk flows through a pipe or conduit 31, into holding means.

This holding means consists of a series of tanks, or containers 32, which may contain varying amounts of milk, but are preferably of the same cubical content, each successive tank being lower than the preceding tank, but of greater diameter than the same. The pipe 31, extends nearly to the bottom of the highest tank 32, and from the top of each tank, a pipe 33, leads to the lower portion of the next adjacent tank. The inlet end of each pipe 33, is in communication with the interior of an equalizer that is illustrated in detail in Figs. VI, and VII. This equalizer comprises a substantially circular trough 34, that is preferably U-shaped in cross section, and is supported in the upper portion of the tank. It has an open top and vertically elongated apertures 35, in its side walls.

The total cubical content of the tanks or containers 32, is equivalent to the bulk of the fluid which is to be held at a pasteurizing temperature for a stated time period. Each tank or container is preferably provided with a dished bottom 36, and a lid 37. It is furthermore preferably covered with suitable heat-insulation 38. It will be evident that the fluid, after it passes over the preliminary heater, above described, where it is raised to the first pasteurizing temperature, will enter the lower portion of the first tank 32, and slowly rise to the equalizer 34, in the top of said tank. Entering said equalizer, it flows through the pipe 33, into the lower portion of the next tank, in which it again gradually rises, and thus passes successively through the holding means.

The fluid discharges from the last tank or container through a pipe 39, and is delivered by means of a rotatable coupling 40, into a pipe 41, which discharges into a trough 42. This trough 42, has a perforated bottom which distributes the milk over a superheater, designated 43, and said superheater, in the present embodiment, constitutes the upper section of another member constructed substantially like the preliminary heater above described. In actual practice the effect of the superheater upon the milk is such as to cause a large amount of evaporation, and for this reason the super-heater may be inclosed by means of metal shields, upon the inner surfaces of which condensation may take place, and this condensation thereafter collected in any convenient manner so as to make the apparatus as economical as possible. It may also be advisable to inclose the other heating and cooling manifolds in a similar manner, depending upon the varying conditions under which the apparatus may be used. In this structure, however, the remaining sections, designated respectively 44, 45, and 46, constitute a cooling means. A re-distributing trough 47, similar to the trough 29, above described is interposed between the sections 44, and 45. A collecting trough 48, is placed beneath the lowermost section 46, and a pipe 49, leading therefrom, conducts the pasteurized fluid to any desired receiver. The sections 45, and 46, of the cooler are connected, as shown in Fig. I, by a coupling 50, and the sections 44, and 45, are also connected by a suitable coupling 51, so that the cooling medium will pass through all the sections in a manner well understood.

For the purpose of supplying a suitable cooling and heating medium to the cooling member, the superheater, and the preliminary heater, the following mechanism may be employed. A refrigerator tank 52, is provided, in which the cooling medium is brought to the desired low temperature, and such medium is conveyed to the lowermost section 46, of the cooler through a pipe 53, leading thereto from said tank 52, a pump 54, being located in said pipe, for the purpose of securing a positive circulation. This cooling medium is discharged from the upper section 44, of the cooler through a pipe 55, into a heater 56, supplied with steam from any suitable source through a pipe 57, the said supply being automatically controlled by a suitable thermostat 58. The temperature of the medium is raised in the heater 56, to the desired degree, and is delivered into the superheater 43, through a pipe 59. A by-pass 60, preferably connects the pipes 55, and 59, and the by-passing action is controlled by suitable valves 61. The heating medium passes out of the superheater 43, through a pipe 62, which extends to another heater 63, which can be supplied with steam from any suitable source by a pipe 64, the said supply being automatically controlled by a thermostat 65, and the heating medium from the heater 63, is delivered to the lowermost section of the preliminary heater, through a pipe 66. It is finally discharged from the preliminary heater through a pipe 67, and may be conducted back to the refrigerating tank 52, through a pipe 68, or discharged entirely outside of the apparatus by a pipe 69, the said pipes 68, and 69, being controlled by valves 70, and 71. For the purpose of supplying the medium to the refrigerating tank 52, a pipe 72, may be employed under control of a valve 73.

Briefly described the operation of this portion of the apparatus is as follows: The medium is first brought to the desired temperature in the tank 52, by any well known means or method, and is discharged into the cooler, comprising the sections 44, 45, and 46. It will be evident that the milk or other fluid will thus be reduced in temperature, and as it is, the temperature of the cooling medium will, of course, be raised. The said medium then enters the heater 56, where its temperature is further raised to the desired degree, and is thence discharged into the superheater 43. In this superheater the temperature of the medium will, of course, be lowered, and consequently, its temperature will again have to be increased before it enters the preliminary heater. The heater 63, is employed for that purpose. In the preliminary heater, its temperature will again be lowered, before it returns to the refrigerating tank 52. If, on the other hand, it is desired to have a continuous flow of the medium through the apparatus, the valve 70, can be closed and the valve 71, opened. In this case, it is necessary to continuously supply the medium, which can be done by opening the valve 73.

In starting the operation of the apparatus, the medium should be put in circulation by the pump 54, and the heating tank 56, should be cut out of service. This can be done by the by-pass 60, and the controlling valves 61. The medium will then pass, without change of temperature, to the heater 63, where sufficient steam is admitted to raise it to the desired temperature for the primary heating of the fluid to be pasteurized. Owing to the absence of any such fluid flowing down over the preliminary heater at the start of the operation, and it not being good practice to bring the cold fluid immediately into contact with the heated surface, a cold water pipe 74, is provided, controlled by a valve 75, and just prior to the starting of the flow of fluid from the trough 25, cold water is turned into the two upper sections of the preliminary heater, thereby reducing the temperature of the heating medium through these two sections.

As soon as the flow of fluid covers the two upper sections, this cold water is cut off. After the time period for the passage of the milk through the holding tanks or containers 33, has expired and the milk commences to discharge through pipe 39, the by-pass valves 61, are properly adjusted to cause the cooling medium to pass from the section 44, through the heater 56, where its temperature is raised as hereinbefore described, and this in turn causes the superheating of the fluid, which is an essential feature of this process of pasteurization.

After all the fluid to be pasteurized has been heated and the flow to the holding tanks discontinues, it will be understood that the operation is stopped for such a period of time as may be necessary to enable the fluid to remain in the last tank 32, for whatever period of time the fluid remained in said tank during the continuous operation, and it then should be drawn off. To accomplish this, a draw-off pipe 76, is located beneath the tanks, and communicates with each, through valve controlled connections 77. This draw-off pipe delivers into a tank 78, having a discharge spout 79, and the rotatable coupling 40, already described can be turned so as to connect either with the discharge pipe 39, or the discharge spout 79, as indicated in dotted lines in Fig. I. It will thus be evident that when the fluid has been kept in the last tank 32, for the desired length of time, the connection 77, is then opened, and said fluid will flow from said tank, into the tank 78, and thence pass over the superheater and cooler. In like manner, the fluid can in turn be withdrawn from the other tanks and discharged, so that the whole amount of fluid treated is heated uniformly.

In holding fluid, such as milk, in tanks, the difference in the specific gravity of milk of varying temperature, is a very important factor, as where a tank is filled with milk at a temperature of say 140 degrees Fahr., as it comes from the heater, and through any irregularity of the heater, milk is supplied to this tank even in a small quantity 2 degrees or 3 degrees lower in temperature, this colder milk will drop rapidly down into the body of the higher temperature milk and where the discharge of the milk is at the bottom of the tank, it is obvious that this lower temperature milk would remain in the tank a much shorter time than the rest of the milk. The milk thus escaping quickly would not have as efficient treatment as the milk that remained in the tank for the proper length of time.

Also even with efficient insulation, the difference in temperatures between the room in which the holding tanks are contained and the temperature of the milk in the tanks, is so great that there is likely to be more or less thermal leakage through the sides of the tanks, resulting in a cooling of the milk next the sides of the tanks, causing it to drop and pass out through the discharge at the bottoms, without remaining in the tanks the proper length of time. In practice this condition is termed "short circuiting" of the milk, and is the cause of a great inefficiency in the treatment of milk in tanks that have the discharge at the bottom, regardless of any means that may be taken to secure an even distribution of the milk as it enters the tank at the top.

By the present invention, these difficulties are entirely overcome, and the danger of inefficient pasteurization of the milk, owing to the decrease in the time of the holding period, is obviated. The milk is supplied to the tanks through a pipe extending nearly to the bottom and the flow of milk within the tank is upward. The equalizer located in the top, through which the milk passes, as it rises, causes an even circulation throughout the whole body in the tank. Any milk that has its specific gravity increased on account of the decrease in temperature, is retarded in its upward flow and remains in the tank longer than otherwise, which is beneficial in the efficiency of the treatment of that particularly lower temperature milk. In like manner, any milk next the side of the tank that may be chilled by thermal transmission through the tank will be made sluggish and remain a longer time in the tank. It is also a well known fact that where fluids are flowing in bodies, there is often a great tendency to form currents, and this in the pasteurizing of milk causes great irregularities in the length of time that such milk is held. This is particularly true where milk is supplied to the top of a holding tank, inasmuch as it causes a disturbance that extends more or less down into the body of the milk. With the present structure, this agitation is of course eliminated.

It is also desired to call particular attention to the economy of operation owing to the great efficiency of the regenerative system. As already explained, the heat collected by the cooling medium during the cooling step, is utilized in the superheating and the heat that is in the heating medium, after the superheating step has taken place, is again utilized in the preliminary heating. At the same time, the medium employed has its temperature lowered in said heating medium before it passes back into the refrigerating tank. It will also be noted that the arrangement provides for gradual increase and decrease of heat. That is to say, in the preliminary heater, the heating medium will be at the lowest temperature in the uppermost section, so that the milk or other fluid will not be brought into immediate contact with the highest temperature during the preliminary heating. The same is true in the cooling, for the milk after it passes from the superheater comes into contact with the uppermost section of the cooler, which is higher in temperature than the bottom section.

By the use of the regenerative system according to my invention, for the temperature treatment of the milk, the danger of freezing the milk is entirely obviated, since it is impossible at any time to reduce the water to a temperature low enough to freeze the milk.

Another difficulty that sometimes occurs is from the fact that if valves are leaky, there is danger of milk passing the same and thus not being fully treated. This danger is obviated in the present structure, for the fluid must pass successively through all the tanks. The only chance of escape is through the draw-off pipe 76, but this pipe, as already explained, discharges into a tank 78, which is disconnected from the system during the principal operation, and any leakage will be observed, and in any event will not pass to the superheater.

It is furthermore of the utmost importance that all valves with which the milk comes in contact should be thoroughly cleansed and thoroughly steamed in order that there may be no question of all parts of the apparatus being raised to or above the boiling point. To obtain this, steam conducting pipes 80, leading from any suitable source, are connected to the various members, and by means of the same, steam can be supplied to all parts of the apparatus to render the same absolutely sterile. Furthermore in order to insure the proper temperatures during the different steps, thermometers 81, are placed in the pipes at desired points.

It will of course be understood that other heaters and coolers may be used in connection with the holding tanks herein shown and described.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus described my invention, I claim:

1. In pasteurizing apparatus, the combination with a plurality of heating means, of fluid holding means, means for conveying fluid to be pasteurized from one heating means to the holding means, means for conveying such fluid from the holding means to the other heating means, and means for supplying heating medium to the second heating means and for directing it from such second heating means to the first heating means.

2. In pasteurizing apparatus, the combination with a plurality of heating means, of fluid holding means, means for conveying fluid to be pasteurized from one heating means to the holding means, means for conveying such fluid from the holding means to the other heating means, means for supplying heating medium to the second heating means and for directing it from such second heating means to the first heating means, and means for increasing the temperature during the passage of the heating medium from the second to the first heating means.

3. In pasteurizing apparatus, the combination with means for heating fluid to a pasteurizing temperature, of means for holding a body of such heated fluid, means for superheating the fluid, means for cooling the fluid, means for directing the fluid to the first heating means, thence to the holding means, from said holding means to the super-heating means, and thence to the cooling means; means for supplying a refrigerating medium to the cooling means, means for conveying such medium from the cooling means to the superheating means, and means for raising the temperature of the said medium during its passage from the cooling means to the superheating means.

4. In pasteurizing apparatus, the combination with preliminary heating means, of means for delivering fluid to be pasteurized thereto, means for holding a body of heated fluid at a predetermined temperature, means for directing the fluid from the preliminary heating means to said holding means, superheating means, means for directing the fluid from the holding means to the superheating means, cooling means, means for directing the fluid from the superheating means to the cooling means, means for supplying a cooling medium to the cooling means, means for conveying the said medium to the superheating means, means for raising the temperature of the medium during its passage to the superheating means, means for conveying the medium from the superheating means to the preliminary heating means, and means for varying the temperature of the medium during its passage from the superheating means to the preliminary heating means.

5. In pasteurizing apparatus, the combination with heating means, of holding means for the fluid heated, comprising a container, means for delivering heated fluid to one portion of the container, and means for withdrawing the heated fluid from the container, comprising a perforated equalizer located in the container, and an outlet conduit communicating therewith.

6. In pasteurizing apparatus, the combination with heating means, of holding means for the fluid heated thereby, comprising a container, means for delivering the heated fluid to the lower portion of the container, means for withdrawing it from the container, comprising a perforated equalizer located in the upper portion of the container and an outlet conduit communicating with said equalizer.

7. In pasteurizing apparatus, the combination with heating means, of means for holding a relatively large body of heated fluid, comprising a plurality of containers that are successively of different heights, means for delivering the fluid from the heating means to the lower portion of the highest container, and means for delivering the fluid successively from one container to the other, said means comprising a substantially U-shaped equalizer trough in the top of each container having perforations in its wall, and a pipe leading therefrom to the lower portion of the next container.

In testimony whereof I have hereunto signed my name at Philadelphia, Pennsylvania, this twenty-sixth day of March, 1914.

SAMUEL M. HEULINGS.

Witnesses:
 JAMES H. BELL,
 E. L. FULLERTON.